United States Patent [19]

Sendov et al.

[11] 4,065,393

[45] Dec. 27, 1977

[54] CONICAL CENTRIFUGE WITH CONTINUOUS ACTION

[75] Inventors: Stoyan Hristov Sendov, Sofia; Ivan Angelov Nikolov, Vidin; Ivan Alexandrov Kuklin, Vidin; Mircho Georgiev Mirchev, Vidin, all of Bulgaria

[73] Assignee: Chimkombinat, Vidin, Bulgaria

[21] Appl. No.: 708,689

[22] Filed: July 26, 1976

[30] Foreign Application Priority Data

Aug. 2, 1975 Bulgaria .................................. 30711

[51] Int. Cl.[2] .............................................. B01D 33/02

[52] U.S. Cl. ...................................... 210/377; 233/30; 233/36; 233/39; 233/42

[58] Field of Search .......................... 210/78, 209–215, 210/360 R, 360 A, 377, 369, 378, 380; 233/42, 41, 39, 36, 35, 30, 29

[56] References Cited

U.S. PATENT DOCUMENTS

| | | | |
|---|---|---|---|
| 65,923 | 6/1867 | Mackey | 210/377 |
| 289,565 | 12/1883 | Ruffin | 210/213 |
| 292,705 | 1/1884 | Stevens | 210/213 |
| 661,943 | 11/1900 | Arend | 233/42 |
| 715,493 | 12/1902 | Lundstrom | 233/42 |
| 2,575,691 | 11/1951 | Smith | 210/360 R |
| 2,748,668 | 6/1956 | Hornbostel | 233/29 |
| 3,136,722 | 6/1964 | Gooch | 210/377 |
| 3,204,868 | 9/1965 | Honeychurch | 233/29 |
| 3,400,827 | 9/1968 | Ziherl | 210/377 |
| 3,409,521 | 11/1968 | Sharples | 233/29 |
| 3,737,038 | 6/1973 | Westfall | 210/377 |

FOREIGN PATENT DOCUMENTS

| | | | |
|---|---|---|---|
| 971,713 | 10/1953 | Germany | 210/377 |

*Primary Examiner*—Frank W. Lutter
*Assistant Examiner*—Frank Sever
*Attorney, Agent, or Firm*—Karl F. Ross

[57] ABSTRACT

A conical centrifuge with continuous action, comprising a cylindrical housing, ending with a cone and a connection in its bottom end for the removal of the solid phase. Inside this cone there is fixed coaxially a cylinder, ending with a cone and a connection for the removal of the liquid phase, and over said cylinder there is disposed a conical rotor attached to a shaft, supported in a bearing box and connected by means of a belt drive to an electric motor, which is fastened to the cover of the housing. Concentrically with the bearing box there is provided a vertical pipe, in which there ends a connection, and this vertical pipe is connected to the bearing box by means of vertical blades, which are inclined with respect to the radius and to their outer ends there are fastened helical-shaped blades.

1 Claim, 2 Drawing Figures

FIG. 1
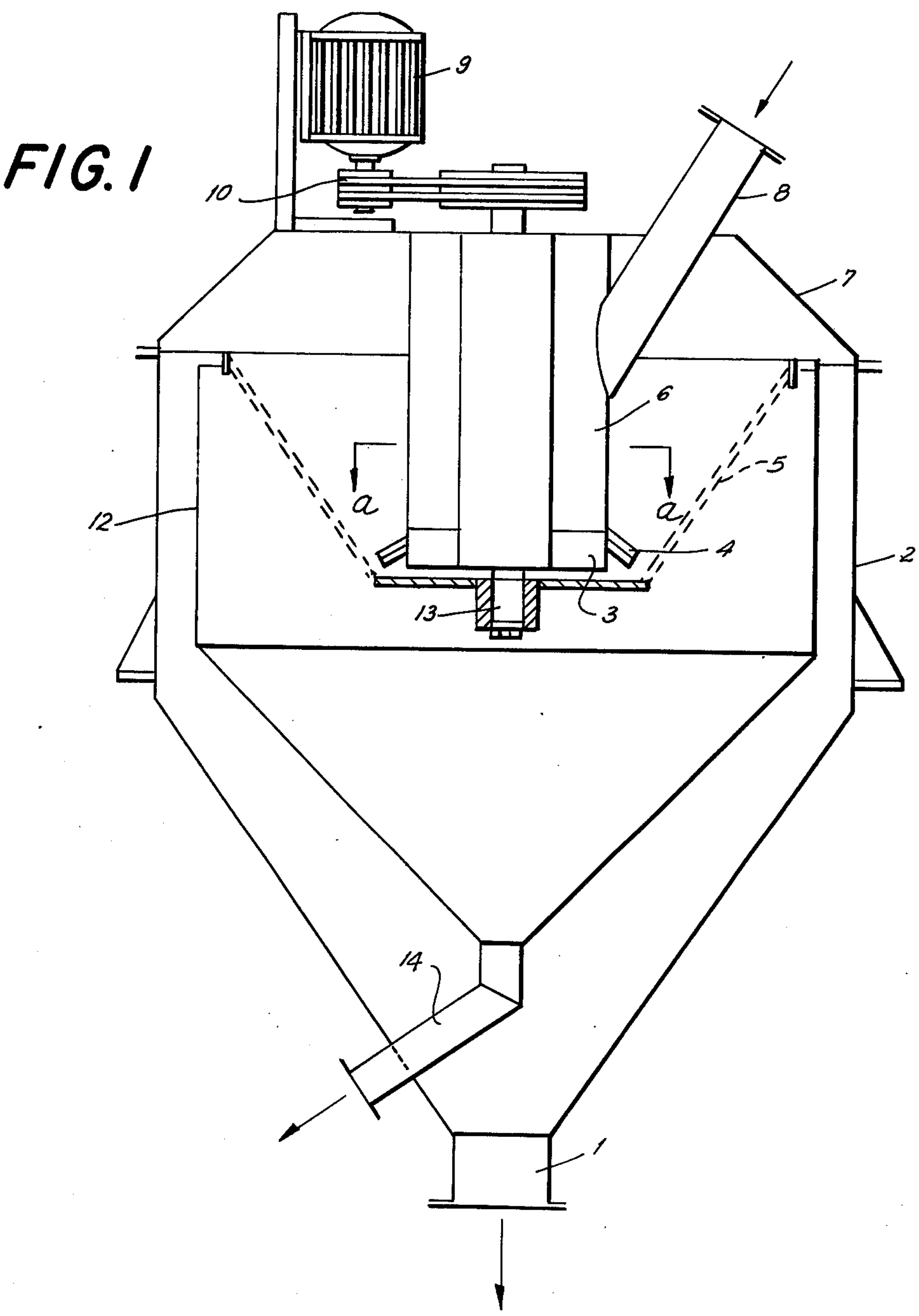
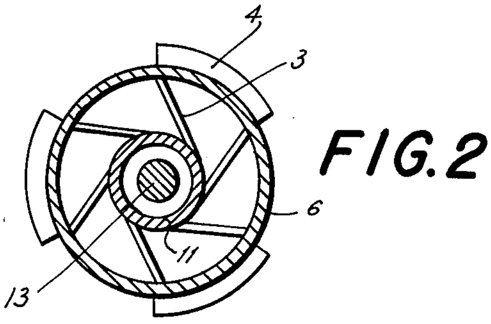
FIG. 2

CONICAL CENTRIFUGE WITH CONTINUOUS ACTION

This invention relates to a conical centrifuge with continuous action, which can be used for straining or filtering non-homogeneous dispersed systems of solid and - liquid, and particularly for separation granulated polyamide from water.

There is known a conical centrifuge with precessing rotor, supported in the bottom and driven by means of two belt drives. The material is supplied in the axis of the centrifuge from the top by means of a pipe, ending with a conical tip which reaches the bottom of the basket. As a result of the precessing motion of the shaft of the rotor, effected by means of two shafts arranged one inside the other, the rotor performs angular oscillations with respect to the central axis of the machine, said oscillations providing the displacement of the solid residue upwards along the cone and its ejection outwards.

The drawback of this type of centrifuges is its very complex design and the impossibility to seal the housing because of the necessity to permit the belts to be observed from the exterior.

It is therefore a general object of the present invention to avoid the drawback of the known conical centrifuges by providing a conical centrifuge with continuous action, which provides a uniform displacement of the material over the conical sieve, which is of simple design and has a sealed housing.

This object is achieved by a conical centrifuge with continuous action, comprising a cylindrical housing ending with a cone and a connection in its bottom end for the removal of the solid phase, and inside the cone there is fixed coaxially a cylinder ending with a cone and a connection for the removal of the liquid phase. Over cylinder there is disposed a conical rotor, fastened to a shaft supported in a bearing box and connected by means of a belt drive to an electric motor, attached to the cover of the housing. In the invention concentrically with the bearing box there is provided a vertical tube in which there ends a connection and the vertical pipe is connected with the bearing box by means of vertical blades, inclined with respect to the radius, and to the outer end of this blades there are fastened spiral-shaped blades.

The advantages of the centrifuge of the present invention lie in that uniform displacement of the material over the conical sieve is obtained for the straining of the material, particularly granulated polyamide, and the sealing of the housing is permitted.

For a better understanding of the invention, its operating advantages and specific objects attained by its use, reference should be made to the accompanying drawing in which there is illustrated and described a preferred embodiment of the invention. In the drawing:

FIG. 1 is a vertical cross-sectional view of the conical centrifuge;

FIG. 2 is a partial cross-sectional view along line *a—a* in FIG. 1.

Referring to the drawing, the conical centrifuge comprises a cylindrical housing 2, covered by a cover 7 and ending in its bottom end with a cone and a connection 1. Inside the housing 2 there is fixed a cylinder 12, ending with a cone and a connection 14. In the bottom end of the cover 7 of housing 2 there is fastened a bearing box 11, in which there is supported the shaft 13, carrying a conical rotor 5. Concentrically to the bearing box 11 there is provided a vertical pipe 6, in which ends a connection 8. The bottom end of pipe 6 is connected to the bearing box 11 by means of vertical blades 3 which are inclined with respect to the radius. Outwardly of blades 3 there are fastened helical blades 4. Attached to the cover 7 is an electric motor 9, connected by means of a belt drive 10 to the shaft 13 of rotor 5.

The conical centrifuge operates as follows:

The non-homogeneous dispersed system is introduced into the centrifuge through connection 8. It flows to the bottom of the ring-shaped space between the bearing box 11 and the vertical pipe 6. From here, as a result of the vertical blades 3, which are inclined with respect to the radius i.e. are tangential (FIG. 2), the material is pushed towards the metal sieve of the rotating rotor 5. The liquid passes through the holes of the sieve in cylinder 12, flows downwards and is removed through the connection 14. The solid particles remain over the sieve and due to the centrifugal force and the helical-shaped blades 4 they are displaced towards the upper end of the rotating rotor. From there the material is thrown in the ring-shaped space between cylinder 12 and housing 2, it falls downwards and is removed through connection 1.

What we claim is:

1. A centrifuge for the separation of a liquid and a solid in a suspension of said solid in said liquid, said centrifuge comprising:

an upright cylindrical housing having a conical bottom formed with a discharge fitting for discharging said solid;

an inner cylinder disposed coaxially within said housing and provided with a conical bottom having a discharge fitting for discharging liquid;

a cover closing said housing at the top thereof;

a generally cylindrical bearing box mounted on said cover and extending coaxially downwardly into said inner cylinder;

a single drive shaft journaled in said bearing box and having a lower end within said inner cylinder below said bearing box and an upper end extending above said cover said single shaft minimizing the requirement for seals within said centrifuge;

a motor mounted on said cover and operatively connected to said upper end of said shaft for driving same;

a rotor connected to said lower end of said shaft within said inner cylinder and formed with an upwardly diverging conical sieve reaching substantially to the top of said inner cylinder whereby solids migrating over the upper edge of said sieve pass around said inner cylinder into the conical bottom of said housing while liquid traversing said sieve passes into the conical bottom of said inner cylinder;

a pipe coaxially surrounding said bearing box and spaced therefrom, said pipe being mounted on said bearing box at the lower end thereof by a plurality of generally flat vertical vanes, said vanes extending tangentially from the outer surface of the lower end of said bearing box to the inner surface of the lower end of said pipe;

a plurality of helical arc blades disposed on the lower end of the outer surface of said pipe; said vanes and blades cooperatively functioning to uniformly distribute said suspension over the inner surface of said conical sieve;

an inlet for said suspension opening into said pipe, said pipe being downwardly open toward said rotor at the bottom of said pipe.

* * * * *